United States Patent
Kaushik et al.

(10) Patent No.: US 11,232,214 B2
(45) Date of Patent: *Jan. 25, 2022

(54) SECURE DATA PROCESSING ON SENSITIVE DATA USING TRUSTED HARDWARE

(71) Applicant: Microsoft Technology Licensing, LLC, Redmond, WA (US)

(72) Inventors: Shriraghav Kaushik, Bellevue, WA (US); Arvind Arasu, Mountain View, CA (US); Spyridon Blanas, Madison, WI (US); Kenneth H. Eguro, Redmond, WA (US); Manas Rajendra Joglekar, Stanford, CA (US); Donald Kossmann, Kirkland, WA (US); Ravishankar Ramamurthy, Redmond, WA (US); Prasang Upadhyaya, Seattle, WA (US); Ramarathnam Venkatesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,010

(22) Filed: May 13, 2020

(65) Prior Publication Data
US 2020/0272744 A1    Aug. 27, 2020

Related U.S. Application Data

(63) Continuation of application No. 15/796,236, filed on Oct. 27, 2017, now Pat. No. 10,671,736, which is a (Continued)

(51) Int. Cl.
*G06F 21/60* (2013.01)
*G06F 21/62* (2013.01)
*H04L 29/06* (2006.01)

(52) U.S. Cl.
CPC ........ *G06F 21/602* (2013.01); *G06F 21/6245* (2013.01); *H04L 63/045* (2013.01);
(Continued)

(58) Field of Classification Search
CPC ............... G06F 21/602; G06F 21/6245; H04L 63/0428; H04L 63/045; H04L 63/062
See application file for complete search history.

(56) References Cited

U.S. PATENT DOCUMENTS

2017/0103217 A1* 4/2017 Arasu ................... H04L 9/0637

OTHER PUBLICATIONS

Bajaj et al., "TrustedDB: A Trusted Hardware based Database with Privacy and Data Confidentiality", SIGMOD'11, Jun. 12-16, 2011. (Year: 2011).*

* cited by examiner

*Primary Examiner* — Noura Zoubair
(74) *Attorney, Agent, or Firm* — Schwegman Lundberg & Woessner, P.A.

(57) ABSTRACT

Methods, systems, and computer-readable media are directed towards receiving, at an untrusted component, a query for a data store. The query includes a plurality of data operations. The data store is accessible by the untrusted component. A first proper subset of data operations is determined from the plurality of data operations that do not access sensitive data within the data store. A second proper subset of data operations is determined from the plurality of data operations that access sensitive data within the data store. The first proper subset of data operations is executed, at the untrusted component, to create first results. The second proper subset of data operations is sent to a trusted component for execution. Second results based on the sending the second proper subset of data operations are received from the trusted component. Results to the query are returned based on the first results and the second results.

13 Claims, 8 Drawing Sheets

Related U.S. Application Data continuation of application No. 14/011,241, filed on Aug. 27, 2013, now abandoned.

(52) U.S. Cl.
CPC ........ *H04L 63/0428* (2013.01); *H04L 63/062* (2013.01); *H04L 2463/062* (2013.01)

SECURE DATA PROCESSING ON SENSITIVE DATA USING TRUSTED HARDWARE

CROSS-REFERENCE TO RELATED APPLICATION

This application is a continuation of and claims priority to U.S. patent application Ser. No. 15/796,236, filed Oct. 27, 2017, entitled "Secure Data Processing of Sensitive Data Using Trusted Hardware", which claims priority to U.S. patent application Ser. No. 14/011,241, filed Aug. 27, 2013, entitled "Secure Data Processing of Sensitive Data Using Trusted Hardware", the disclosures of which are incorporated by reference in their entirety.

BACKGROUND

An organization typically stores a considerable amount of enterprise data whereby data security/privacy during data storage and communication is a serious concern. Cloud computing environments provide additional challenges, such as when data is migrated to a cloud database management system (DBMS) from an on-premises computing system. Some challenges relate to database encryption, where sensitive columns are encrypted before being stored in a network resource. Conventional encryption schemes also make it difficult to perform computations without at least temporarily decrypting the data in an untrusted environment. These challenges make it difficult to provide a secure database-as-a-service paradigm in the cloud computing environment.

Often, database management systems use insecure software components to run data processing tasks on behalf of a client application. These systems sometimes rely upon resource-limited devices for security, but these devices become overloaded with query processing without significantly more computational and storage capacities. In general, this arrangement leads to an inefficient utilization of secure computational power in the devices and bandwidth on the network between the hardware devices and clients. This limits the achievable performance for most applications, including high-throughput applications running data processing tasks in the cloud computing environment.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards secure data processing over sensitive data using trusted hardware. In one aspect, the trusted hardware includes one or more dedicated secure processing units of which each unit is in a trusted state/relationship with machines operated by data owners/consumers/clients. These machines include computing devices that download or upload the sensitive data onto or from network resources. Such resources include data stores maintained over a network, including a database management system running within a cloud computing environment.

In one aspect, the dedicated trusted hardware augments or extends the database management system with secure expression evaluation services. When interpreting expressions, the database management system simulates homomorphic encryption functionality by migrating expression evaluation to the dedicated trusted hardware instead of performing such evaluation at untrusted components running within the database management system. Using this approach, the database management system can assure database users of the sensitive data's protection from misappropriation. Furthermore, limiting the trusted hardware's footprint enables the use of more efficient and reconfigurable secure processing units to implement trusted hardware functionality.

In another aspect, supporting general-purpose query processing may involve restricting expression evaluation over the sensitive data to a tightly-coupled secure coprocessor-database management system architecture. This architecture integrates custom-designed or reconfigured trusted hardware with commodity hardware and traditional database management system, improving resource utilization/performance while securing the sensitive data.

In one aspect, the trusted hardware implements a set of data centric primitives that, during runtime, process expressions involving real values contained in encrypted fields/columns of a database table. Accordingly, data management and staging tasks are offloaded onto computational resources in an untrusted database management system. Furthermore, only values that the trusted hardware reads are transferred by the untrusted database management system, conserving bandwidth to the network. In one aspect, the database management system fetches and feeds the appropriate database pages to the trusted hardware, which performs related computation(s).

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
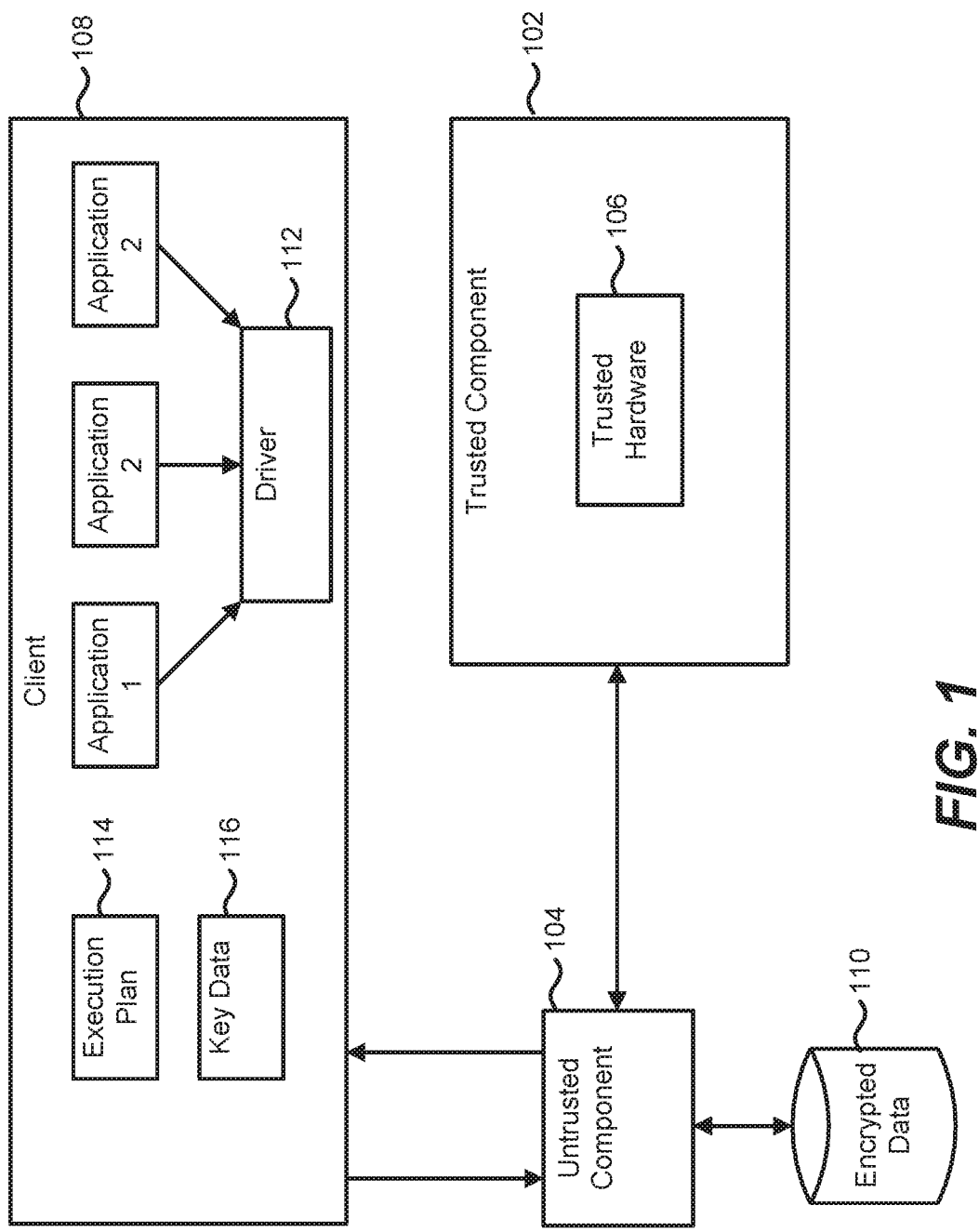
FIG. 1 is a block diagram illustrating an example secure data processing system according to one example implementation.

Various aspects of the technology described herein are generally directed towards computing architecture configured to provide secure data processing, including expression evaluation, over sensitive data while reducing or eliminating the risk of data leakage. The computing architecture, according to one example implementation, isolates trusted hardware from untrusted components in order to delegate expression evaluation over sensitive data away from the untrusted components, which enhances security by limiting exposure of the sensitive data to the trusted hardware. Furthermore, by restricting the untrusted components to handling expression evaluation over non-sensitive data, the computing architecture may improve security, performance and/or resource utilization.

Expression evaluation generally refers to a low-level (e.g., lowest-level) computational abstraction supporting components that manipulate data types, including basic or abstract data types. Expressions typically involve computations, such as comparison, arithmetic and other functions (e.g., minimum (MIN), maximum (MAX) and/or the like). Expressions corresponding to sensitive data may involve decrypting the sensitive data, performing related computations, and encrypting any resulting sensitive data; migrating these expressions to the trusted hardware secures the sensitive data from unwanted disclosure/misappropriation.

One example implementation of the trusted hardware maintains application encryption keys, permitting secure exchanges of sensitive data with applications running on client machines regardless of any untrusted component. Each secure processing unit of the trusted hardware stores a device encryption key for maintaining the application encryption keys in a protected or encrypted state while performing secure computations on the sensitive data. The trusted hardware implements data centric primitive logic, for example, comprising a set of programs whose instructions effectuate expression evaluation. Note, the trusted hardware may support query processing, concurrency control, and other functionality while implementing a core set of data centric primitives, such as encryption, decryption, and expression evaluation. This considerably improves the trusted hardware's performance in terms of computational resources and bandwidth and enables a provably secure dedicated platform to be built on the trusted hardware.

By way of example in one implementation, the trusted hardware is a purpose-built circuit (e.g., Field-Programmable Gate Arrays (FPGA)) loaded with a trusted bitstream (e.g., binary code) and capable of being uniquely identified by remote client machines. FPGAs, as one embodiment of the trusted hardware in a cloud computing environment, utilizes trusted third-party authorities, standard FPGA bitstream protection hardware/techniques, and standard public-key infrastructure and key exchange mechanisms. It is appreciated that other embodiments for the trusted hardware are envisioned by the present disclosure. As some example embodiments, secure coprocessors and hardware security modules (HSMs) can be programmed with a set of data centric primitive related functions.

In order to operate transparently to the client machines, a hardware/software component, running between the client machines and the trusted hardware, may be configured to manage application encryption keys, encrypt/decrypt transmissions to/from a network resource managing data stores, and modifying data store operations to comply with the data store schema. One example embodiment of this hardware/software component includes a driver running on a client machine or on the network resource that uses application-specific keys to decrypt/encrypt various data (e.g., statements, tuples, query results, constants, parameter settings and/or the like).

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and secure data processing in general.

FIG. 1 is a block diagram illustrating an example secure query processing system according to one example implementation. Example components of this system may comprise a trusted component 102 and an untrusted component 104 configured in a tightly-coupled architecture. The untrusted component 104 generally refers to one or multiple computing devices (e.g., physical servers or virtual machines) that perform various data store operations on behalf of client machines and, in some instances, accesses trusted hardware 106 within the trusted component 102 in order to perform expression evaluation on sensitive data. Although the description of FIG. 1 refers to sensitive data as encrypted, it is appreciated that the description also applies to other forms of sensitive data.

The trusted hardware 106 generally refers to a secure processing unit configured to interpret expressions as a set of data centric primitives and then, execute instructions or code implementing those data centric primitives. The trusted hardware 106 may include dedicated circuitry and/or other components for encryption, decryption, expression evaluation and other data centric primitives, including concurrent operations. One example embodiment may be referred to as a stack machine that can be programmed to evaluate expressions. The trusted hardware 106 may integrate with custom-designed and/or commodity hardware.

Functionality associated with the untrusted component may be migrated to the trusted hardware 106, for example, functionality that may be invoked when processing encrypted data. Such functionality may be segmented into a set of data centric primitives. By configuring the trusted hardware 106 with compatible program code implementing these primitives, executing data store operations involving encrypted data can be isolated from executing other data store operations.

At the request of one or more client machines, such as a client machine 108, a management system (e.g., Microsoft® SQL Server®, Microsoft® Excel® and/or the like) running within the untrusted component 104 retrieves and/or stores encrypted data 110 in one or more data stores. Using a driver 112 (e.g., an ODBC driver), applications running within the client machine 108 issue data store operations (e.g., Microsoft® SQL statements related to queries, sub-queries, and/or updates, functional code related to distributed filtering/sorting/summary operations, spreadsheet macros, and/or statistical procedures and/or the like). FIG. 1 depicts these applications as "Application 1" and "Application 2." Alternatively, data store operations may be issued via embedded SQL or another console/interface to a components running on the management system that are configured to extend functionality between the driver 112 and the trusted component 104. In either implementation, the data store operations are transformed into an execution plan 114 comprising a series of expressions of which at least some expressions correspond to the encrypted data 110. Those expressions include code referencing data centric primitive logic within the trusted hardware 106. For example, by attaching hooks to appropriate code segments (e.g., Microsoft® SQL Server® code) implementing these expressions and inserting code routing the encrypted data 110 to the trusted hardware 106, the driver 112 may leverage database management functionality for expressions that do not involve the encrypted data 110.

The driver 112 running within the client 108 may extend basic database functionality by persisting in key data 116 an encryption key (e.g., a 128-bit symmetric encryption key) corresponding to each application running on the client 108 or on a cloud resource and using such a key to decrypt/ encrypt various data (e.g., statements, tuples, query results, constants, parameter settings and/or the like). The driver 112 also may be configured to perform query optimization because statistics (e.g., histograms) used for query optimization reveal information about underlying database records.

One example embodiment of the driver 112 handles Microsoft® SQL statements, which involves communicating the execution plan 114 for processing by a Microsoft® SQL Server® instance running within the untrusted component 104, and awaits secure results data. The management system receives the execution plan 114 from the driver 112, interprets that plan using iterators, applies any updates to the encrypted data 110, and returns secure results to the client 108. To improve compilation performance, the driver 112 locally caches database related metadata and statistics. An original copy of such database related metadata and statistics are stored, in encrypted form, by the untrusted component 104 in compliance with the confidentiality requirements of the application as specified in a security model.

While the above description relates to SQL statements, it is appreciated that other embodiments of the driver 112 handle data store operations defined under different data processing paradigms. As such, the driver 112 may translate Apache Hive™ HiveQL™ statements into the execution plan 114 comprising distribution processing jobs (e.g., a graph of Map-Reduce jobs) of which each job may include a sequence of generalized expressions representing an abstraction of that job. Furthermore, the untrusted component 104 may run each job over a set of processors, including secure processing units in the trusted hardware 106 configured to interpret the expressions as data centric primitives, which when invoked, uses one or more encryption keys to perform computations on the sensitive data and returns secure results.

Figure 2:
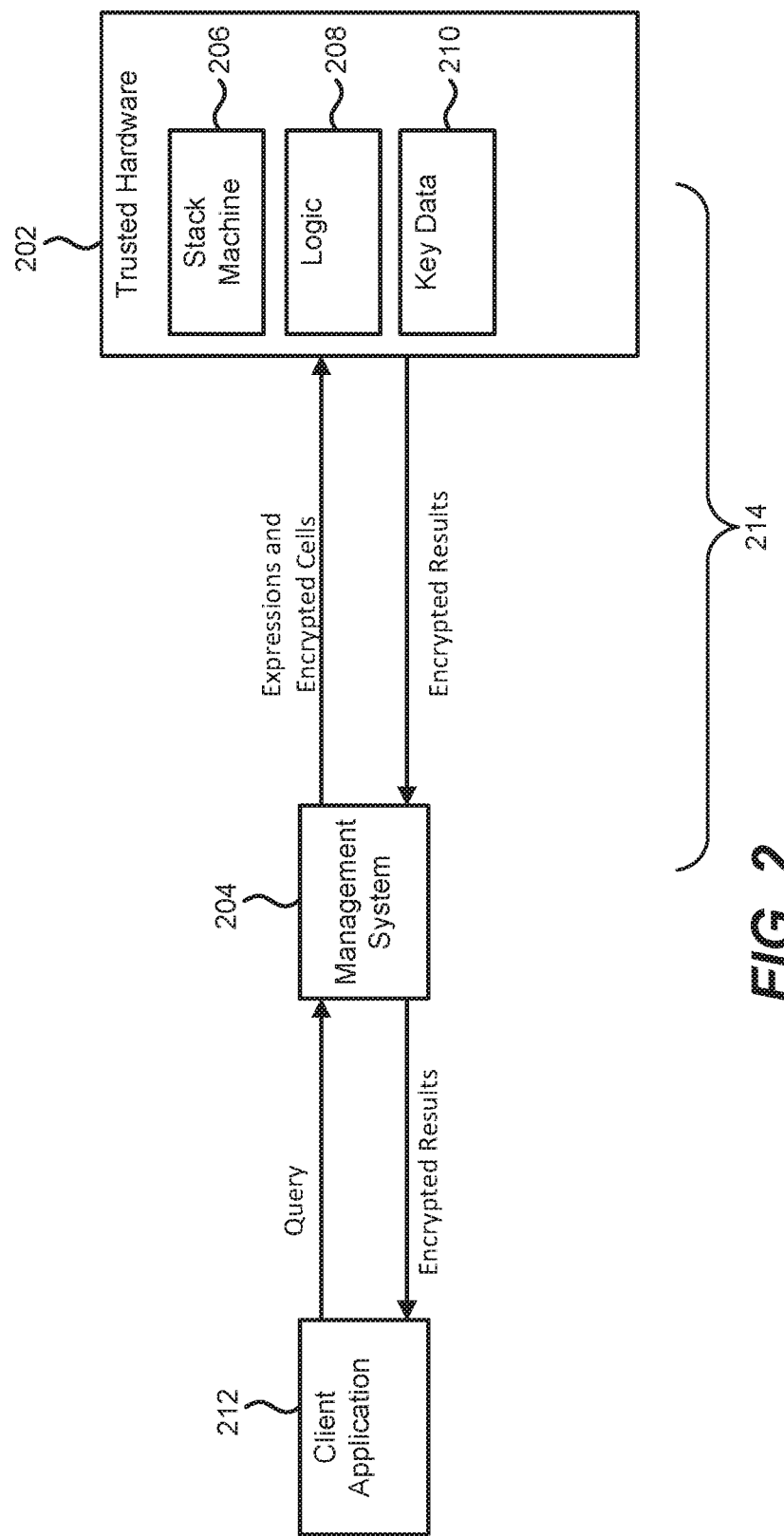
FIG. 2 is a block diagram illustrating an example tightly-coupled architecture for secure data processing according to one or more example implementations.

FIG. 2 is a block diagram illustrating an example architecture for secure data store processing according to one example implementation. Untrusted component(s) and trusted component(s) of the example architecture may form an asymmetric distributed system of which one or more hardware/software components partition a set of data store operations between those involving sensitive data and those operations involving non-sensitive data. The distributed system handles the execution of both sets of operations between the trusted and the untrusted components.

The example architecture may resemble a tightly coupling between a trusted component operating trusted hardware 202 and an untrusted component running a management system 204. By way of example, the trusted hardware 202 is a purpose-built circuit (e.g., FPGA) loaded with a known and trusted bitstream. The trusted hardware 202 may be uniquely identified by remote client machines using a pre-programmed device identifier. The use of the trusted hardware 202 in a cloud computing environment relies on a trusted third-party authority, standard FPGA bitstream protection hardware/techniques, and standard public-key infrastructure and key exchange mechanisms.

The management system 204 includes various components, such as a storage manager that performs input/output (I/O) of data blocks to/from disks, a transaction manager and one or more processing units (e.g., an interpreter, expression evaluation services, an optimizer, a runtime system and/or the like). The storage manager assumes control over buffer pools, database table indexes and/or the like. The transaction manager performs concurrency control, write-ahead logging and/or the like.

When the management system 204 requests expression evaluation over encrypted data, a stack machine 206 running within the trusted hardware 202 executes logic 208 implementing data centric primitives in one example implementation. Using encryption keys stored in key data 210, the logic 208 generally decrypts the encrypted data using a key corresponding to a client application 212, perform computations as directed by the expressions, and return secure results data after encrypting such results with the key.

Securing the trusted hardware 202 from misappropriation involves at least securely storing encryption keys in the key data 210. One example implementation leverages built-in design protection functionality, including the capability to encrypt and sign bitstreams with an encryption scheme (e.g., AES and a hash-based message authentication code (HMAC)). Trusted hardware developers generally create a unique symmetric key for each device and program this key into a small non-volatile write-only memory inside the trusted hardware 202 before being deployed to the cloud. The trusted hardware 202 encrypts and signs bitstreams from the application 212 with this key, creating a specific bitstream for the trusted hardware 202. Since the device encryption key and decrypted bitstreams are maintained within the trusted hardware 202, adversaries and/or untrusted cloud computing providers cannot ascertain decrypted values for any encrypted cells.

According to one example implementation, the trusted hardware 202 uses an application encryption key to decrypt encrypted cell data and/or encrypt results data. The application encryption key may be securely provided to the trusted hardware 202 without leaking information to the management system 204 by, for example, encrypting the application encryption key with a public key corresponding to the trusted hardware 202 under a public-key infrastructure. Using a corresponding private key, the trusted hardware 202 decrypts the application encryption key. If the application encryption key is to be stored for later use, the trusted hardware 202 encrypts and signs the application encryption key with a symmetric device encryption key. When the application encryption key is to be retrieved, the trusted hardware decrypts and authenticates the application encryption key with the device-specific encryption key.

The following table describes example data store operations and for each operation, a set of data centric primitives that are invoked during the execution of that operation.

| | |
|---|---|
| Filter (4 = 5) | $Dec(\overline{A}) = Dec(\overline{5})$ |
| Add (A + B) | $Enc(Dec(\overline{A}) + Dec(\overline{B}))$ |
| Hash Join (T1.A = T2.B) | $Hash(Dec(\overline{A}))$; $Hash(Dec(\overline{B}))$; $Dec(\overline{A}) = Dec(\overline{B})$ |
| Aggregate (Sum(B)) | $Enc(Dec(\overline{B}) + Dec(\overline{PartialSum}))$ |
| Index Operation | $FindPos(Dec(\overline{k}), \{Dec(\overline{k_1}), \ldots, Dec(\overline{k_n})\})$ |
| Range Lock | $Dec(\overline{v}) \in [Dec(\overline{l}), Dec(\overline{h})]$ |

Regarding the above table, $\overline{A}$ indicates the ciphertext of A and Enc, Dec, and Hash represent functions for encryption, decryption, and hashing, respectively. It is appreciated that the set of data centric primitives provided above may include other primitive functions. Furthermore, each data centric primitive may be applicable to different data store technologies, including embodiments where the data model is based on columns, graphs, key-values and/or documents.

For a filter operation (e.g., a SELECT query or a Map Function) with a predicate (A=5) where column A is encrypted, the stack machine 206 executes the logic 208 implementing a data centric primitive (Dec($\overline{A}$)=Dec($\overline{5}$)) corresponding to a comparison between the encrypted column and the corresponding encrypted constant. To implement indexing over encrypted columns, the FindPos primitive retrieves an encrypted (index) key and finds a position of that key in an array of encrypted (index) keys. Similarly for computing an addition primitive (A+B), the stack machine 206 decrypts both columns, adds them and re-encrypts the result. Regarding the join operation predicate between tables T1 and T2, the stack machine 206 match records in the two tables, decrypts the column values, hashes the join attributes, and checks for equality. The rest of hash join operation—memory management, writing hash buckets to disk, and reloading them—runs in the management system 204.

Figure 3:
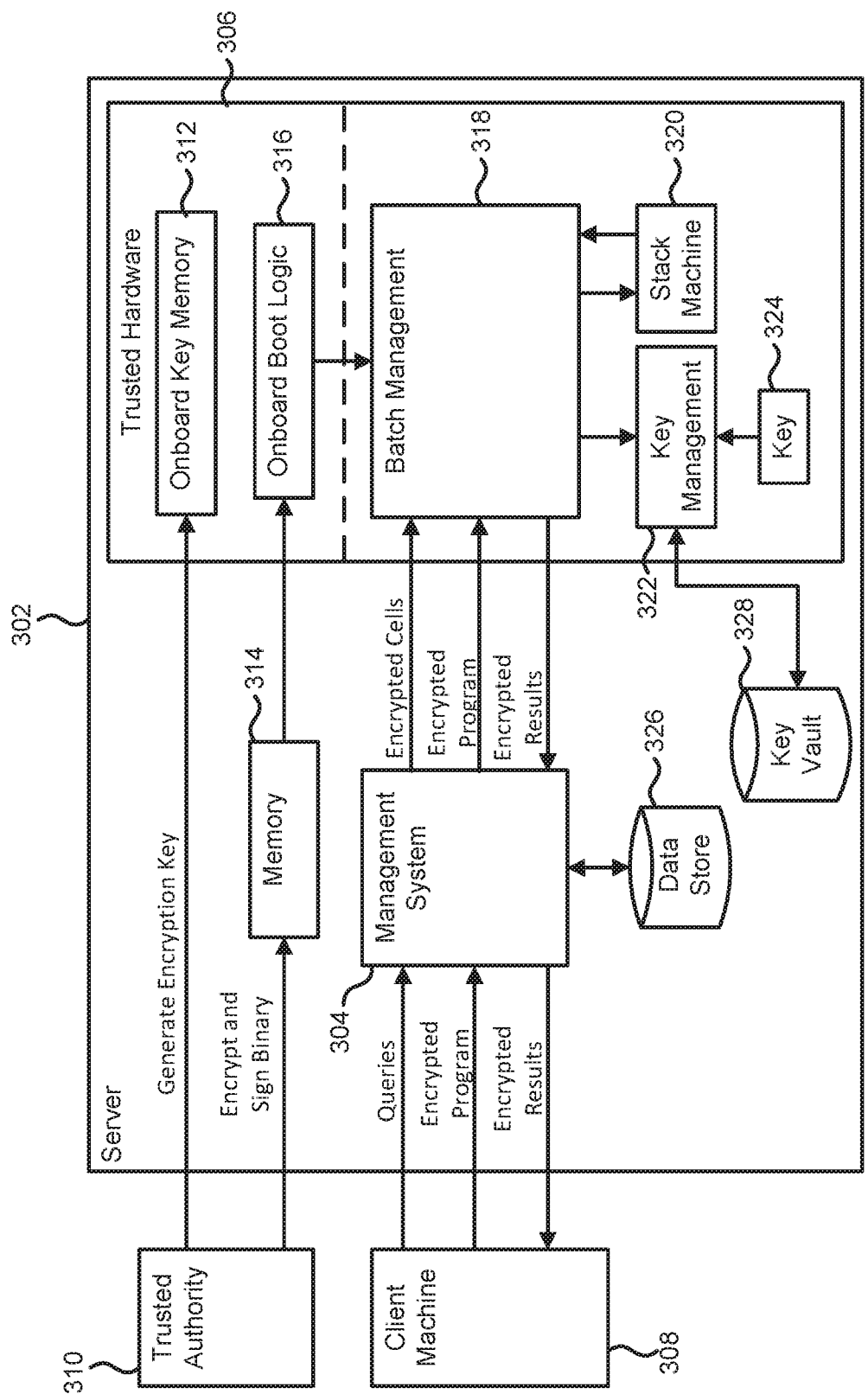
FIG. 3 is a block diagram illustrating an in-cloud server for an extended database management system according to one or more example implementations.

FIG. 3 is a block diagram illustrating an in-cloud server for an extended database management system according to one example implementation. The in-cloud server, such as a server 302, provides client machines with secure data processing services over a network. Using one or more secure processing units, the server 302 interprets and executes expressions on sensitive data without accessing such data in an unsecure form, ensuring the client machines that the sensitive data is protected and valid while stored in a cloud computing environment.

One example implementation of the server 302 runs a modified instance of a management system 304 that has access to the trusted hardware 306. A client machine 308 establishes a schema (e.g., a database schema) indicating a format for each data item, including which data items are to be protected with encryption. This schema is signed and installed into the management system 304 and distributed among users of the database. Other client machines can then connect to this server instance to upload data. The server 302 may run the management system 304 with some components modified to optimize data transfers with the trusted hardware 306 and/or the client machine 308.

The management system 304 executes data store operations that do not depend on encryption and delegates those operations that require decryption/encryption to the trusted hardware 306. As described herein, each data store operation involving sensitive data may derive from a set of expressions of which interpreting each expression invokes corresponding program code in the trusted hardware 306. As an example, the management system 304 instructs the trusted hardware 306 to evaluate expressions on (e.g., strongly) encrypted records within a database. The trusted hardware 306 also may be configured to evaluate expressions on database records comprising encrypted column data and/or unencrypted/cleartext column data by executing data centric primitive programs on the encrypted column data and performing traditional expression evaluation over the non-sensitive cleartext column data.

Protecting sensitive data while processing queries issued by applications running on the client machine 308 involves at least securely storing application encryption keys. One example implementation leverages built-in design protection functionality, including the capability to encrypt and sign bitstreams according to an encryption scheme (e.g., AES and a hash-based message authentication code (HMAC)). A trusted authority 310 generates a symmetric device encryption key for the trusted hardware 306 and programs this key into on-board key memory 312 prior to deployment to the server 302. The trusted hardware 306 encrypts and signs application data bitstreams from the client machine 308 with this key, creating a unique bitstream. Since the device encryption key and the application data bitstreams are maintained within the trusted hardware 306, adversaries and/or untrusted cloud computing providers cannot ascertain decrypted values for any encrypted cells.

The trusted authority 310 generates a unique public/private key pair and inserts the private key into a bitstream configuring the trusted hardware 306. This bitstream is then encrypted and signed with the corresponding device encryption key. This protected bitstream is transferred to non-volatile memory 314 on the appropriate board opening inside the server 302. On-board boot logic 316 retrieves the bitstream when authenticating configuration data and/or performing an initial boot configuration. The public identity of the trusted hardware 306 is published using standard public-key infrastructure (PKI).

One example implementation of the trusted hardware 306 provides a secure processing unit and example components of the secure processing unit may include batch management 318, a stack machine 320 and key management 322, which securely stores encryption keys 324 (e.g., the device encryption key as described herein). While executing data store operations, such as queries, the management system 304 utilizes these example components to produce secure results by, for example, instructing the stack machine 320 to execute stack code implementing data centric primitives to effectuate expression evaluation over encrypted data. Although FIG. 3 depicts the trusted hardware 306 with one secure processing unit, it is appreciated that a plurality of secure processing units may be configured in the trusted hardware 306.

Sensitive data is encrypted by the client machine 308 before being uploaded into a data store 326. The client machine 308 defines a fixed cryptographic key for particular encrypted fields when defining the schema. This key is shared to other users and uploaded to the server 302. Although the database owner and other clients can only communicate with the trusted hardware 306 through an untrusted provider hosting the management system 304, the client machine 308 can securely send encryption keys to the trusted hardware 306 by encrypting such keys with the public key. These keys, which now may be referred to as wrapped keys, can only be decrypted with the private key. The wrapped keys protect the client encryption keys from being compromised regardless as to how they are transmitted. The wrapped keys may be cached by the server 302 in a key vault 328 for later re-transmission to the trusted hardware 306.

Hardware/software components running on the client machine 308 and/or the management system 304 modify native queries to invoke trusted hardware code when, for example, manipulating encrypted data fields. These modified queries call out to stack programs that run on the stack machine 320. These programs are encrypted and signed so that they are protected while in transit. When received by management system 304, these programs are sent to the trusted hardware 306 and cached for later use. When an untrusted component, which may or may not be the management system 304, executes queries or sub-queries over encrypted data, the untrusted component provides the batch management 318 with the encrypted data and a program identifier referring to which program to execute on the encrypted data. Accordingly, the program used to evaluate instances of data centric primitives is derived at query compilation time, while at runtime, the management system 304 supplies parameters to the program.

Some example implementations of the trusted hardware 306 dedicate resources to executing a core set of data centric primitives and leave other data store operations to the management system 304. Given the tight coupling between the management system 304 and the trusted hardware 306, which may be connected by a PCI-express bus, certain optimizations can be implemented in the management system 304 to handle any communication latency.

It is appreciated that other example embodiments may configure additional secure processing units on the trusted hardware 306 such that a set of concurrent operations can be distributed over a plurality of secure processing units. The set of concurrent operations may include intra-query and/or inter-query expressions involving the sensitive data. For example, the management system 304 may instruct each stack machine within the plurality of secure processing units to execute the same stack code with a different set of parameters (e.g., input parameters). The stack code may implement a concurrent operation within a single query or over a plurality of similar queries. As another example, the management system 304 may instruct each stack machine to execute at least one of a plurality of unrelated expressions. One example implementation of these expressions include (e.g., sequential and/or random) instructions of an execution plan.

Figure 4:
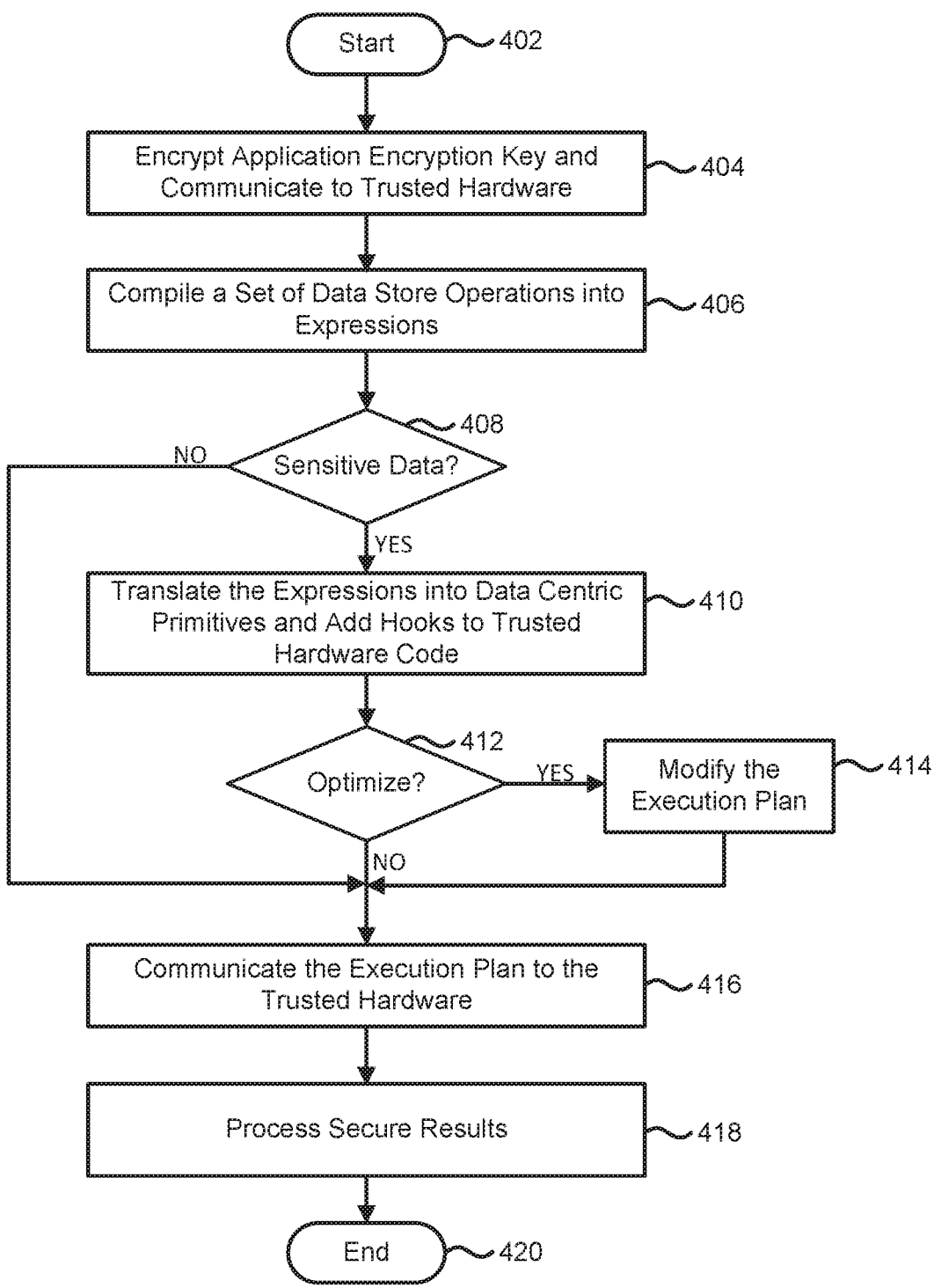
FIG. 4 is a flow diagram illustrating example steps for transforming expressions and encrypted data into an execution plan invoking data centric primitive logic according to one or more example implementations.

FIG. 4 is a flow diagram illustrating example steps for transforming expressions and encrypted data into an execution plan invoking data centric primitive logic according to one example implementation. The set of expressions may be formatted into the execution plan in which some expressions may reference corresponding programs implemented in the trusted hardware.

One or more hardware/software components (e.g., a driver 112 of FIG. 1) may be configured to perform at least some of the example steps while possibly omitting others. Step 402 commences the example steps and proceeds to step 404 where an application encryption key is encrypted and communicated to trusted hardware. As described herein, the application encryption key may be generated specifically for when a particular client machine or application desires secure data processing over sensitive data in a data store. By way of example, encrypting the application encrypted key using the trusted hardware's public key prevents another entity from extracting the application encrypted key while in transmission to the trusted hardware. Providing the application encryption key to the trusted hardware ensures that all data store operations over encrypted data utilize the trusted hardware; in addition, the client machine may dynamically recruit additional hardware (e.g., secure processing units) by communicated a wrapped key using the additional hardware's public key.

Step 406 is directed towards compiling a set of data store operations into expressions for execution by one or more processing units. These expressions may be formatted into an execution plan as executable code. Step 408 determines whether any one of the expressions involves sensitive data. Based upon an established schema, for example, one or more expressions may involve encrypted data items indicating an owner's desire to have such expressions evaluated in a secure processing unit. If step 408 identifies a set of expressions that perform at least some computation on sensitive data, step 408 proceeds to step 410. If step 408 fails to identify one expression involving sensitive data, step 408 proceeds to step 416.

Step 410 is configured to translate the set of expressions into data centric primitives in order to add hooks to the execution plan that invoke trusted hardware code implementing those primitives. One example implementation replaces each of the set expressions with a function call to an appropriate data centric primitive program. As the execution plan is interpreted/executed, when the function call is invoked, associated encrypted data is routed to the trusted hardware.

Step 412 determines whether to optimize the set of expressions. Some example implementations of the trusted hardware dedicate resources to executing a core set of data centric primitives and leave other data store operations to the management system. Given the tight coupling between the management system and the trusted hardware, which may be connected by a PCI-express bus, certain optimizations can be implemented in the management system to handle any communication latency. Optimizations include configuring the data centric primitive logic to minimize round-trips and/or inefficient forms of inter- and intra-query batching of trusted hardware code invocations.

If step 412 decides to improve resource utilization by enhancing the execution plan, step 412 proceeds to step 414. Step 414 modifies the execution plan. According to one example implementation, each parameterized expression invoking a data centric primitive forms a work unit of which multiple such work units may aggregated for batched transfer and execution. As another example, a series of expressions within the execution plan is reordered to efficiently partition the expressions amongst a plurality of secure processing units in the trusted hardware. These units may execute one or more corresponding data centric primitives substantially in parallel. Furthermore, some units may execute one program while other units execute another program.

On the other hand, step 412 omits step 414 and proceeds to step 416 if, for example, enhancing the execution plan with concurrency and/or batch management results in little or no improvement(s). Step 416 communicates the execution plan to the trusted hardware for interpretation and execution. Step 418 processes secure results returned from the trusted hardware. Step 420 terminates the example steps depicted in FIG. 4.

Figure 5A:
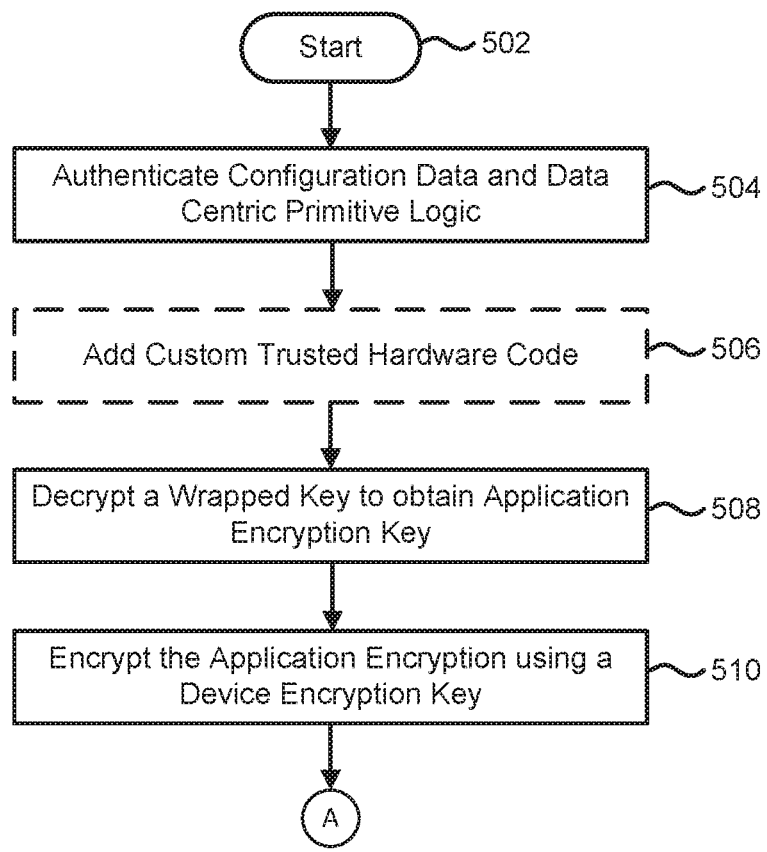
FIGS. 5A-B depict a flow diagram illustrating example steps for evaluating an expression according to one or more example implementations.
Figure 5B:
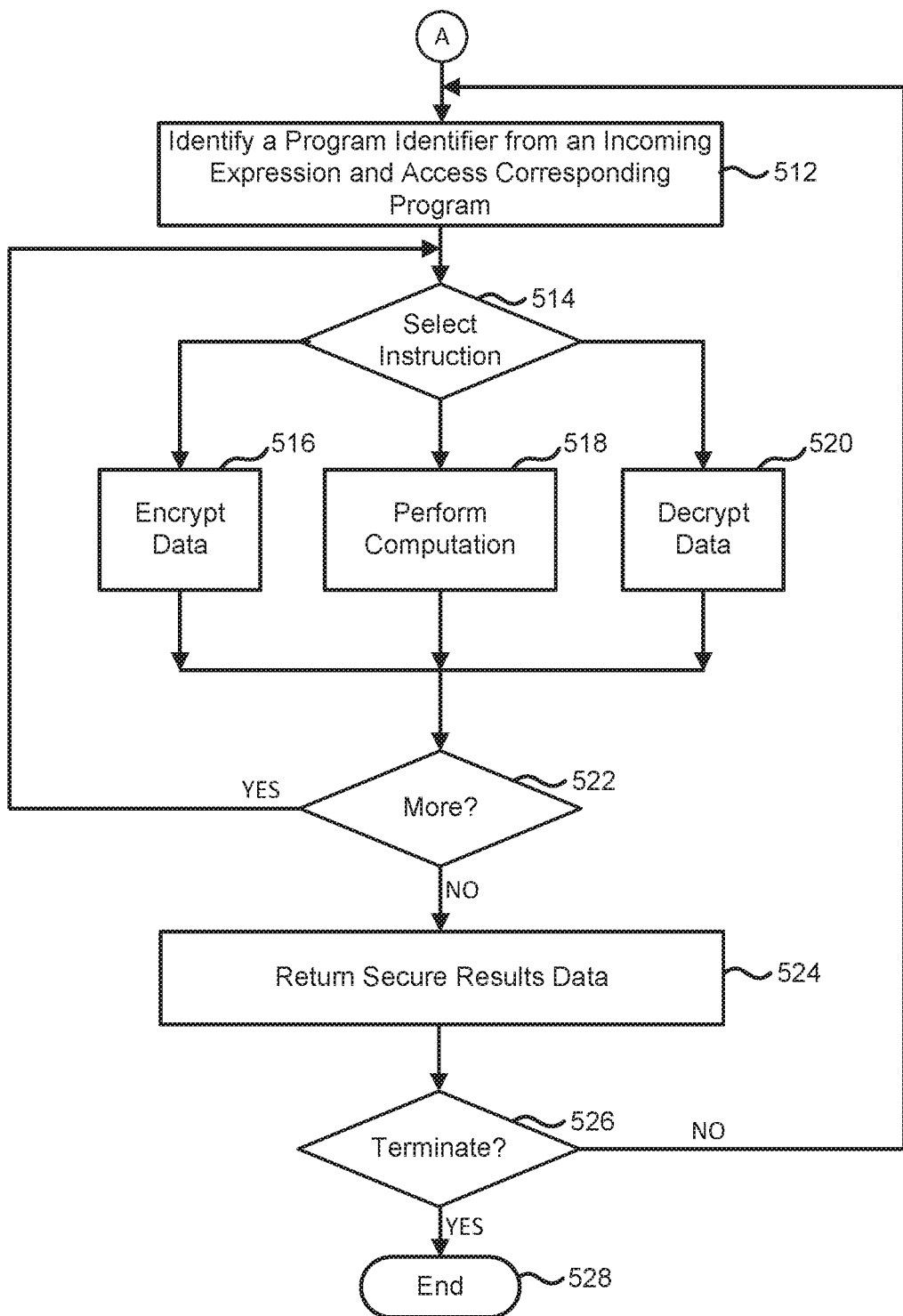

FIGS. 5A and 5B depict a flow diagram illustrating example steps for expression evaluation in trusted hardware according to one example implementation.

One or more hardware/software components (e.g., trusted hardware, such as the trusted hardware 106 of FIG. 1) may be configured to perform the example steps. Step 502 commences the example steps and proceeds to step 504 where configuration data and data centric primitive logic is authenticated, for example, using a device encryption key established prior to the trusted hardware's deployment onto the network resource. Since both the cloud computing provider and the clients trust a signing authority, a bitstream representing the configuration data and the data centric primitive logic can be encrypted and signed using the device encryption key. Because the bitstream is signed, the trusted hardware cannot load an altered bitstream without being detected during startup, causing the trusted hardware to fail the loading process. Since the bitstream is encrypted, the identity of the trusted hardware cannot be compromised.

Optional step 506 relates to adding custom trusted hardware code to the configuration data. One example implementation of database management system provides the trusted hardware with an encrypted and signed bitstream/binary representing an alternate program for implementing a basic data centric primitive or a program for implementing a user-defined or complex data centric primitive. Because such programs are encrypted and signed, the representative bitstream can be securely stored in memory and authenticated during startup.

Step 508 refers to decrypting a wrapped key to obtain an application encryption key. As described herein, the application encryption key may be secured using the trusted hardware's public key. When the wrapped key arrives, the trusted hardware uses the private key to decrypt the wrapped key and extract the application encryption key. Step 510 refers to encrypting the application encryption key for secure storage using the device encryption key. Step 510 proceeds to step 512, is depicted on FIG. 5B along with additional example steps.

Step 512 is directed to identifying a program identifier from an incoming expression and accessing a corresponding program from the data centric primitive logic and/or the custom trusted hardware code. The corresponding program comprises trusted hardware code whose instructions implement an appropriate data centric primitive. These instructions may be executable on a secure processing unit within the trusted hardware, such as a stack machine. The trusted hardware code may be encoded in addressable memory as a bitstream or binary. By way of an example, the incoming expression represents a function call or other invocation of the trusted hardware code.

Step 514 selects a next instruction to execute from the corresponding program. If the next instruction refers to an encryption primitive, step 514 proceeds to step 516, which instructs a secure processing unit to encrypt the data. If the next instruction refers to an expression evaluation primitive, step 514 proceeds to step 518, which instructs the secure processing unit to perform one or more computations, such as an addition, a comparison, a hash value calculation and/or the like. If the next instruction refers to a decryption primitive, step 514 proceeds to step 520, which instructs the secure processing unit to decrypt the data. Step 522 determines whether there are more instructions to be executed. If at least one instruction remains in the program, step 522 returns to step 514. Otherwise, step 522 proceeds to step 524 where the trusted hardware returns secure results data. At step 526, the example steps of FIGS. 5A-B determine whether to terminate. If, for instance, the client changes the application encryption key to deallocate the trusted hardware, step 524 proceeds to step 528 where the example steps terminate. Otherwise, step 526 returns to step 512 where the trusted hardware awaits another expression to interpret and evaluate.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
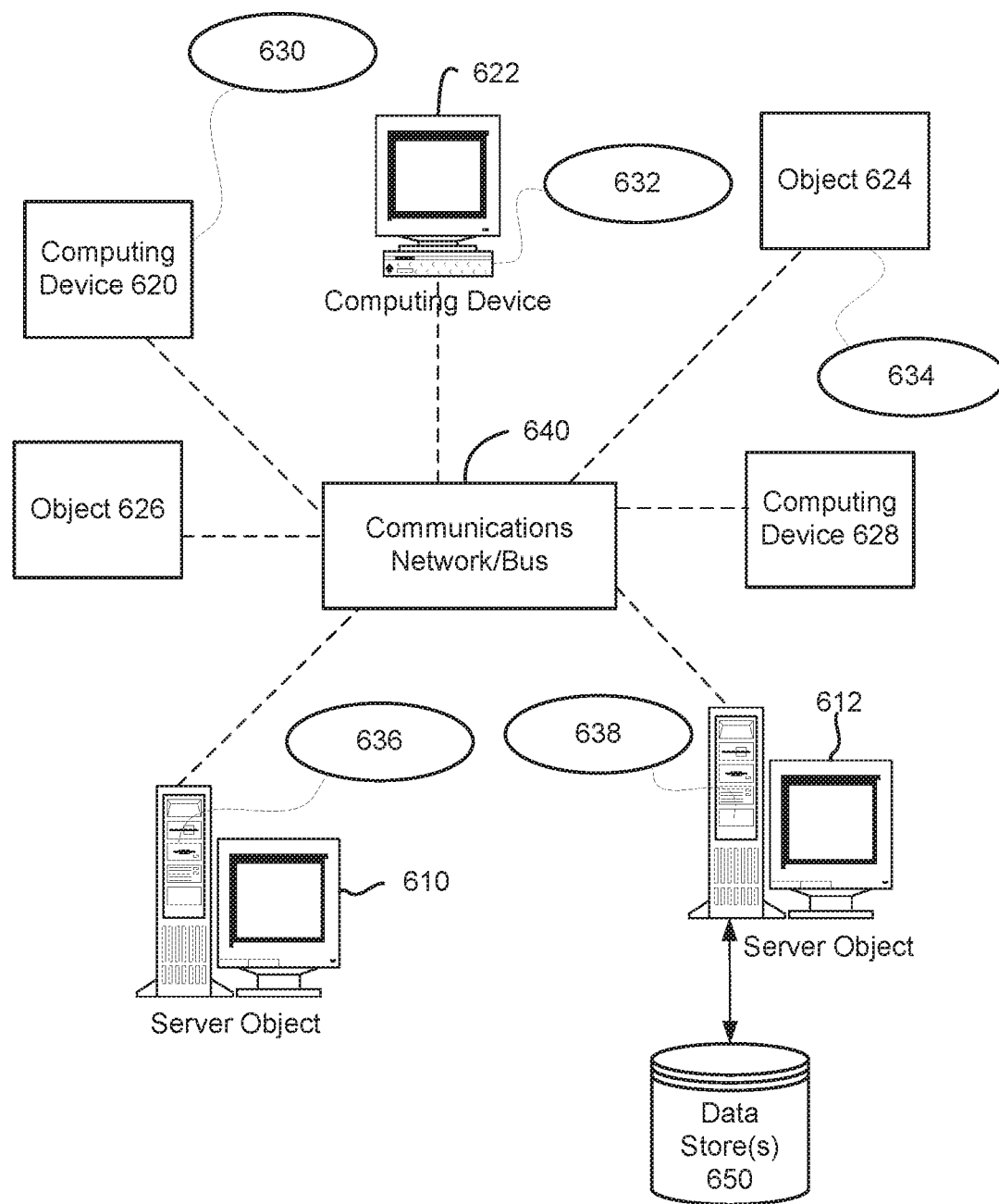
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances. Computing object 612, for example, acting as a server provides client computing objects or devices 620, 622, 624, 626, 628, etc. with access to storage resources within data store(s) 650.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
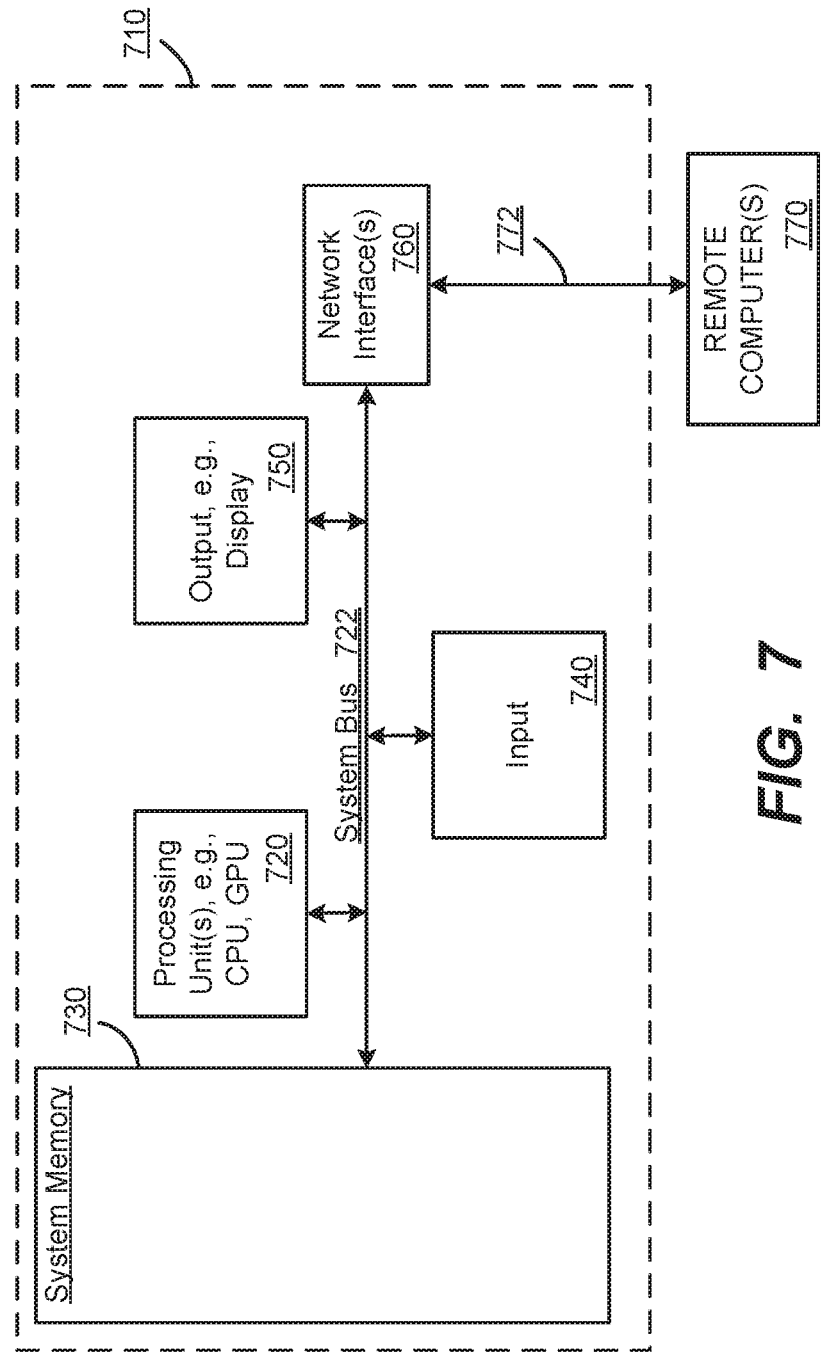
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method comprising:
sending from a client device to an untrusted component, a query for a data store, the query comprising a plurality of data operations, wherein the data store is accessible by an untrusted component and by a trusted hardware component, wherein the query comprises encrypted data, and wherein the untrusted component does not have a key to decrypt the encrypted data;
wherein the data operations are operable to:
access data within the data store that is not sensitive by generating and executing a first proper subset of the data operations from the plurality of data operations via the untrusted component to generate first results; and
access encrypted sensitive data within the data store by executing a second proper subset of the data operations via the trusted hardware component to generate second results, wherein the second proper subset of data operations is translated into a first set of data primitives and provided to the trusted hardware component by the untrusted component;
receiving from the untrusted component, the first results; and
receiving from the untrusted component, the second results.

2. The method of claim 1 wherein a first data primitive of the first set of data primitives is associated with an encrypted program that is sent to the trusted hardware component.

3. The method of claim 2 wherein the first set of data operations are translated into a plurality of data primitives.

4. The method of claim 2 wherein the encrypted program is executed via the trusted hardware component as part of executing the second proper subset of data operations.

5. The method of claim 1 and further comprising encrypting the query prior to sending the query to the untrusted component.

6. The method of claim 5 wherein encrypting the query comprises encrypting query parameters.

7. The method of claim 5 wherein encrypting the query comprises encrypting an ID column of the query.

8. The method of claim 1 and further comprising:
decrypting the second results; and
providing the decrypted second results to an application.

9. A non-transitory machine-readable storage device having instructions for execution by a processor of a machine to cause the processor to perform operations to perform a method, the operations comprising:
sending from a client device to an untrusted component, a query for a data store, the query comprising a plurality of data operations, wherein the data store is accessible by an untrusted component and by a trusted hardware component, wherein the query comprises encrypted data, and wherein the untrusted component does not have a key to decrypt the encrypted data;
wherein the data operations are operable to:
access data within the data store that is not sensitive by generating and executing a first proper subset of the data operations from the plurality of data operations via the untrusted component to generate first results; and access encrypted sensitive data within the data store by executing a second proper subset of the data operations via the trusted hardware component to generate second results, wherein the second proper subset of data operations is translated into a first set of data primitives and provided to the trusted hardware component by the untrusted component;

receiving from the untrusted component, the first results; and receiving from the untrusted component, the second results.

10. The device of claim 9 wherein the operations further comprise encrypting the query prior to sending the query to the untrusted component.

11. The device of claim 9 wherein the operations further comprise:

decrypting the second results; and providing the decrypted second results to an application.

12. A device comprising:

a processor; and a memory device coupled to the processor and having a program stored thereon for execution by the processor to perform operations comprising:

sending from a client device to an untrusted component, a query for a data store, the query comprising a plurality of data operations, wherein the data store is accessible by an untrusted component and by a trusted hardware component, wherein the query comprises encrypted data, and wherein the untrusted component does not have a key to decrypt the encrypted data;

wherein the data operations are operable to:

access data within the data store that is not sensitive by generating and executing a first proper subset of the data operations from the plurality of data operations via the untrusted component to generate first results; and access encrypted sensitive data within the data store by executing a second proper subset of the data operations via the trusted hardware component to generate second results, wherein the second proper subset of data operations is translated into a first set of data primitives and provided to the trusted hardware component by the untrusted component;

receiving from the untrusted component, the first results; and receiving from the untrusted component, the second results.

13. The device of claim 12 wherein the operations further comprise:

encrypting the query prior to sending the query to the untrusted component;

decrypting the second results; and providing the decrypted second results to an application.

* * * * *